United States Patent [19]
Watanabe et al.

[11] Patent Number: 6,151,893
[45] Date of Patent: Nov. 28, 2000

[54] FLEXIBLE TUBE FOR AUTOMOBILE EXHAUST SYSTEMS

[75] Inventors: Shouji Watanabe; Hiroyuki Aihara; Tadashi Nakasuji; Eizo Suyama; Katsuyuki Okada, all of Tokyo, Japan

[73] Assignee: Calsonic Corporation, Tokyo, Japan

[21] Appl. No.: 09/155,646

[22] PCT Filed: Feb. 3, 1997

[86] PCT No.: PCT/JP97/00263

§ 371 Date: Oct. 2, 1998

§ 102(e) Date: Oct. 2, 1998

[87] PCT Pub. No.: WO97/28359

PCT Pub. Date: Aug. 7, 1997

[30] Foreign Application Priority Data

Feb. 2, 1996 [JP] Japan .................................. 8-017461
Feb. 2, 1996 [JP] Japan .................................. 8-017462

[51] Int. Cl.[7] ...................................................... F01N 7/00
[52] U.S. Cl. ........................... 60/322; 60/323; 285/49; 285/149; 285/226; 285/300; 285/301; 285/299
[58] Field of Search ........................ 60/322; 285/49, 285/299, 300, 226, 301, 149

[56] References Cited

U.S. PATENT DOCUMENTS

| | | | |
|---|---|---|---|
| 5,437,479 | 8/1995 | Hartling et al. | 285/49 |
| 5,482,330 | 1/1996 | Holzhausen | 285/226 |
| 5,639,127 | 6/1997 | Davey | 285/49 |

FOREIGN PATENT DOCUMENTS

| | | |
|---|---|---|
| 3-047421 | 2/1991 | Japan . |
| 3-049316 | 3/1991 | Japan . |
| 7-035719 | 2/1995 | Japan . |
| 7-049028 | 2/1995 | Japan . |
| 8-319826 | 12/1996 | Japan . |

*Primary Examiner*—Willis R. Wolfe
*Assistant Examiner*—Sneh Varma
*Attorney, Agent, or Firm*—Foley & Lardner

[57] ABSTRACT

A flexible tube for an automobile exhaust system which has a bellow assembly to absorb the first exhaust pipe and the second exhaust pipe for the an exhaust system having a cylindrical outer cover (5) made of plate to cover the outer periphery of the bellows (3)1 the first collar (7') and the second collar (7") with the risers (7a', 7a") bent toward the inner surface (5a) of the outer cover (5); the first elongation displacement stopper member (6') and the second elongation member displacement stopper member (6") respectively formed by bending the inner side of the outer cover (5); and the first elastic stopper member (8') and the second elastic stopper member (8") provided at the risers (7a', 7a") of both collars (7', 7"). As a further modification, the second outer cover (9) may be provided inside of the outer cover (5) to form displacement stoppers (9a, 9b) by bending the both end portions of the second outer cover.

5 Claims, 7 Drawing Sheets

FLEXIBLE TUBE FOR AUTOMOBILE EXHAUST SYSTEMS

TECHNICAL FIELD

This invention belongs to a technical field of a flexible tube for the automobile exhaust system which has bellows for absorbing displacements of the first exhaust pipe and the second exhaust pipe attached to the automobile exhaust system.

BACKGROUND TECHNOLOGY

Conventionally, there are flexible tubes for automobile exhaust systems available, for example, the flexible tube disclosed in the Japanese Utility Model Laid-Open Application No. 47421/1991.

As shown in FIG. 10, the conventional flexible tube is provided with the cylindrical shell 105 through the wire mesh 111 over the entire outer peripheral of the bellows 103, and further with the wire mesh 111 disposed in a labyrinth construction formed with the collars and the folded portions of the shell 105.

For tension, compression, bending and other possible forces to be applied on the flexible tube, the elasticity of the wire mesh 111 filled in between the shell 105 and the bellows 103 can moderately limit the deformation of the bellows 103, thus increasing the service life of the flexible tube. Further, the solid shell 105 covering the outer periphery of the bellows 103 can prevent the bellows 103 from damaging by kicked pebbles during car running. The labyrinth construction located at both longitudinal ends of the bellows 103 and provided with the wire mesh 111 can prevent muddy water from entering.

However, the conventional flexible tubes for automobile exhaust systems have following problems:

(1) Since the wire mesh may also elastically deform along with the deformation of the bellows to moderately limit the deformation magnitude of the bellows for a displacement input of the bellows, the total spring constant of the flexible tube may depend on the sum of the spring constants of the bellows and the wire mesh, thereby being increased as the displacement increases. Further, the wire mesh covering the outer periphery of the bellows may increase the spring constant of the bellows for compression force, if the wire mesh should enter into the root clearance of the bellows due to its partial deformation or partial loosening.

In other words, the desirable displacement absorption of the bellows largely depends on how the wire mesh is properly arranged, thus necessitating the need for controlling the filling process of the wire mesh.

Therefore, when filling the wire mesh around the entire outer periphery of the bellows to have the displacement absorption capability which can moderately restrict an unexpected deformation of the bellows, the spring constant of the bellows must be previously set as low as to prevent an abnormal rise in the spring constant of the flexible tube due to an improper arrangement of the wire mesh. This means the necessity of the larger total number of bellows, thus resulting in a larger size and weight of the flexible tube.

(2) Even if, at the initial installation, the wire mesh is uniformly distributed in between the shell and the bellows, repetitive and irregular application of tension, compression, bending and other forces on the wire mesh during service may cause an irregular (dense and thin) displacement of the wire mesh.

Therefore, it may become difficult during the service life to control the maximum displacement limitation of the elongation, contraction and flexure of the bellows in a stable manner. Nevertheless, a smaller maximum displacement limitation means a lower displacement absorption, and a larger maximum displacement limitation means a shorter longevity of the bellows.

(3) In this case, the positioning of the shell is made by the charged wire mesh, thus resulting in a larger number of charging man hours or a larger cost.

(4) The inner side of the bellows is directly subject to the high temperature of exhaust gas, so that an extended duration of car running or running under a heavy load may cause an extremely high temperature of the bellows, which may tend to bring about material change or high-temperature salt contamination or corrosion of the bellows, thus resulting in a shorter longevity of the bellows.

Further, with a conventional type of the flexible tube (disclosed in the Japanese Utility Model Laid-Open Application No. 69320/1994), a flexible casing (what is called inner blade) made of stainless fine wire fabric is installed inside the bellows 103 so as to protect the bellows from exhaust gas.

However, this inner blade is not only of high cost, but also may deform due to contact to the bellows when the flexible tube is under force, thus not only resulting in increment of cost of the flexible tube, but also causing an increased spring constant of the bellows under flexure.

Considering the solution of the above problems, this invention has been made.

The first target of the invention is: With an automobile exhaust system having a bellow assembly (bellows) therein to absorb the displacements of the first exhaust pipe and the second exhaust pipe to be installed in the automobile exhaust system, the flexible tube according to the invention consists of a small-sized lightweight configuration without using the conventional wire-mesh filling construction, thus achieving a low cost, good control of a stable elongation displacement limitation, and an increased longevity of the bellows as well as an enhancement in displacement absorption capability in bending and shearing directions.

The second target of the invention is: To achieve the first target, while the flexible tube according to the invention maintains the maximum displacement limitation function of the bellows in the contraction direction.

The third target of the invention is: To achieve the first or second target, while the flexible tube according to the invention not only suppresses a significant rise in construction cost as far as possible when a casing is to be installed inside the bellows so as to prevent the bellows from being affected by exhaust gas, but also prevents a rise in spring constant of the bellows when the flexible tube is subject to flexure.

The fourth target of the invention is: To achieve the first or second target, while the flexible tube according to the invention suppresses the thermal effect of exhaust gas to the bellows.

DISCLOSURE OF THE INVENTION

With the flexible tube according to the first invention for achieving the aforementioned first target, in the flexible tube consisting of a bellow assembly or bellows 3 whose both ends are respectively connected to the first exhaust pipe 1 and the second exhaust pipe 2 so as to absorb the displacements of the both exhaust pipe 1, 2, and an outer cylindrical member provided so as to cover the outer periphery of the bellows 3 to protect the bellows 3 for damage and prevent it from too much elongating, the aforementioned outer cylindrical member comprises:

an outer cylindrical cover 5 made of plate to cover the outer periphery of the bellows 3;

a first collar 7' and a second collar 7" which are respectively connected to the both ends of the bellows 3, and whose inner ends are respectively bent up toward the inside surface of the aforementioned outer cover 5 so as to form risers 7a' and 7a";

a first elongation displacement stopper member 6' and a second elongation displacement stopper member 6" which are respectively formed by bending the both ends of the aforementioned outer cover 5 inward, and whose inner faces function to restrict the elongation-directional maximum displacement of the bellows 3; and a first elastic stopper member 8' and a second elastic stopper member 8" which are respectively provided at the risers 7a', 7a" of the aforementioned both collars 7', 7" so as to leave a tube-axis-directional gap t1 equivalent to the allowable maximum displacement of the bellows 3 to the respective stopper surfaces of the aforementioned elongation displacement stopper members 6', 6", and to support the inner faces at the both ends of the aforementioned outer cover 5 so that the central portion of the bellows be as the bending-directional absorption point.

When such vibration as to give a pipe-axis-directional, bending-directional or shear-directional displacement to the first exhaust pipe 1 and the second exhaust pipe 2 from the engine or the car body, such a configuration as above can show such a displacement absorption capability that a displacement input is absorbed in accordance with a uniform deformation characteristics enough to deform the bellows 3 as a whole.

Among those displacements, when a larger pipe-axial-directional elongation displacement is concerned, both elongation displacement stoppers 6', 6" and both elastic stopper members 8', 8" together help to restrict the elongation-directional maximum displacement of the bellows 3, thus preventing the bellows 3 from being over-elongating.

Further, when a pipe-axial-perpendicular-directional displacement is concerned, the deformation of the bellows 3 with such a higher freedom that makes the central portion of the bellows 3 as the bending-directional absorption point can easily absorb a bending force or a shear force.

Furthermore, if pebbles are being kicked up by a running car, the protection function of the outer cover 5 can prevent the bellows 3 from being deformed or damaging.

Relative to the first invention, the flexible tube according to the second invention is further characterized by:

Forming a first contraction displacement stopper member 9' and a second contraction displacement stopper member 9" on the both ends of the outer cover 5 inwardly at such a distance apart from the aforementioned elongation displacement stopper members 6', 6", that the surfaces of the inwardly bent members 9', 9" facing to the both elastic stopper members 8', 8" with a gap equivalent to the allowable maximum displacement in the tube-axial direction function as stopper surfaces to restrict the contraction-directional maximum displacement of the bellows 3.

When a larger tube-axis-directional contraction displacement than other displacements takes place, such configuration as described above can restrict the contraction-directional maximum displacement of the bellows by the both contraction displacement stopper members 9', 9" along with the both elastic stopper members 8', 8", thereby preventing the contraction deformation of the bellows from becoming larger.

Relative to the first and second inventions, the flexible tube according to the third invention is further characterized by:

Providing an exhaust pipe extension portion 1a or an exhaust pipe partition portion 1b to the aforementioned exhaust pipe 1 so as to almost cover the inner periphery of the bellows 3, to set an arbitrary radial clearance t3 in between the exhaust pipe extension portion 1a or the exhaust pipe partition portion 1b and the bellows 3.

Such a configuration as described above can activate the exhaust pipe extension portion 1a or the exhaust pipe partition portion 1b to fully display its inner blade functions such as temperature insulation, thermal shielding or the reduction of gas flow sound.

The flexible tube according to the fourth invention comprises (refer to FIG. 7):

A bellow assembly or bellows 3 connected to the first and second exhaust pipes 1, 2 to absorb the elongation and other displacement of the both exhaust pipes 1, 2 by the deformation of the accordionlike components or bellows;

A first collar 7 and a second collar 7 respectively connected to both end straight cylindrical portions of the bellows 3, to which radial risers are attached;

A first elastic stopper member 8 and a second elastic stopper member 8 made of elastic and heat-resistant material, which respectively cover the first and second risers 7', 7":

A first cylindrical outer cover 6 covering the outer periphery of the bellows 3, whose both ends are respectively supported by the aforementioned first and second elastic stopper members 8', 8":

A second cylindrical outer cover 9 covering the outer periphery of the aforementioned accordionlike portions of the bellows 3 which is integrally fixed to the internal and central portion of the first cylindrical outer cover 6;

A first elongation displacement stopper member 6' and a second elongation displacement stopper member 6" respectively formed by inwardly bending both ends of the first cylindrical outer cover 6, which respectively have gaps between the first elastic stopper member 8' and the second elastic stopper member 8" so as to restrict the elongation-direction maximum displacements of the bellows 3; and A first contraction displacement stopper member 9a' and a second contraction displacement stopper member 9b' respectively formed by inwardly bending both ends of the second cylindrical outer cover 9, which respectively have gaps between the first elastic stopper member 8' and the second elastic stopper member 8" so as to restrict the contraction-direction maximum displacements of the bellows 3.

When such a vibration as to give rise to tube-axis-directional, bending-directional or sharing-directional displacement to the first exhaust pipe 1 and the second exhaust pipe 2 is inputted from the engine or the car body, such a configuration as described above can absorb the displacement input by the deformation of the bellows 3.

With this displacement absorption action, since the bellow assembly is the single member whose both end portions are rigidly connected respectively to the first exhaust pipe 1 and the second exhaust pipe 2, while the both outer covers 6, 9 are elastically supported by the both elastic stopper members 8', 8" at a slightest contact area, the spring constant of the flexible tube depends essentially on only the spring constant of the bellows 3 as far as the displacement magnitude is subject to restriction.

Therefore, in increasing the spring constant of the flexible tube or a guideline for displacement absorption performance up to the level satisfying the requirement, there is no need for considering other spring-constant increasing elements than the bellows 3, thus limiting the calculation only to the spring constant of the bellows 3, resulting in a smaller number of bellow components and in small size and light weight.

Even if a larger elongation displacement should be inputted, the bellows 3 cannot be over-extended for the following reason:

Since provision is made for the first and second elongation displacement stopper members 6', 6" which are respectively formed by inwardly bending the both end portions of the first outer cover 6, when the first and second elastic stopper members 8', 8" displace toward a tube-axis direction as the both exhaust pipes 1, 2 are making elongation displacements, (1) as far as the displacement magnitude is within the preset gap, the elastic stopper members 8', 8" can move smooth as they are making contact to the inner surface of the first outer cover 6; (2) when the elastic stopper members 8', 8" run against the both elongation displacement stopper members 6', 6" they move slightly assisted by the elasticity of the both elastic stopper members 8', 8" and then, the both elastic stopper members 8', 8" will soon come to a halt so as to restrict the elongation displacement maximum displacement of the bellows to which the both elastic stopper members 8', 8" are connected.

Further, even if a larger contraction displacement should be inputted, the bellows 3 cannot be over-contracted for the following reason:

Since provision is made for the first and second contraction displacement stopper members 9a', 9b' which are respectively formed by inwardly bending the both end portions of the second outer cover 9, when the first and second elastic stopper members 8', 8" displace toward a tube-axis direction as the both exhaust pipes 1, 2 are making contraction displacements, (1) as far as the displacement magnitude is within the preset gap, the elastic stopper members 8', 8" can move smooth as they are making contact to the inner surface of the first outer cover h; (2) when the elastic stopper members 8', 8" run against the both contraction displacement stopper members 9a, 9b, move slightly assisted by the elasticity of the both elastic stopper members 8', 8" and then, the both elastic stopper members 8', 8" will soon come to a halt so as to restrict the contraction displacement maximum displacement of the bellows to which the both elastic stopper members 8', 8" are connected.

During the time of the above displacement restriction, since both of the elongation and contraction directional maximum displacements of the bellows 3 are restricted by the gap between the both elastic stopper members 8', 8" and the stopper surfaces, only an initial setting of proper gap can satisfactorily control a stable displacement restriction magnitude.

Even when pebbles are being kicked up by tire and others during car running, the outer periphery of the bellows c is double-guarded by the outer covers 6, 9, so that the bellows 3 can be guarded from damage.

Therefore, the longer endurance performance of the bellows 3 can be warranted by the damage protection of the outer covers 6, 9 as well as the prevention of over-extension and over-contraction by the displacement restriction.

In relation to the fourth invention, the flexible tube according to the fifth invention is further characterized by (refer to FIG. 7):

Providing a number of air vents 10 opened in the aforementioned first outer cover 6, so as to evacuate high-temperature air stagnant in the outer peripheral space of the bellows 3.

When high-temperature exhaust gas flows inside the bellows 3 for extended period of time, such a configuration as described above may have high-temperature air in the outer peripheral space of the bellows 3 covered with the both outer covers 6, 9 as the bellows 3 become hot.

But, the plurality of air vents 10 opened in the first outer cover 6 at positions communicating to the outer peripheral space of the bellows 3 can evacuate the hot air to the ambient atmosphere through the air vents 10, thus maintaining the temperature of the outer peripheral space of the bellows 3.

Therefore, such suppression of thermal affection for the bellows 3 can further enhance the longevity of the bellows 3.

MOST PREFERABLE EMBODIMENTS

Now, most preferable embodiments according to the present invention will be described as follows: (Refer to attached drawings)

Embodiment 1

Figure 1:
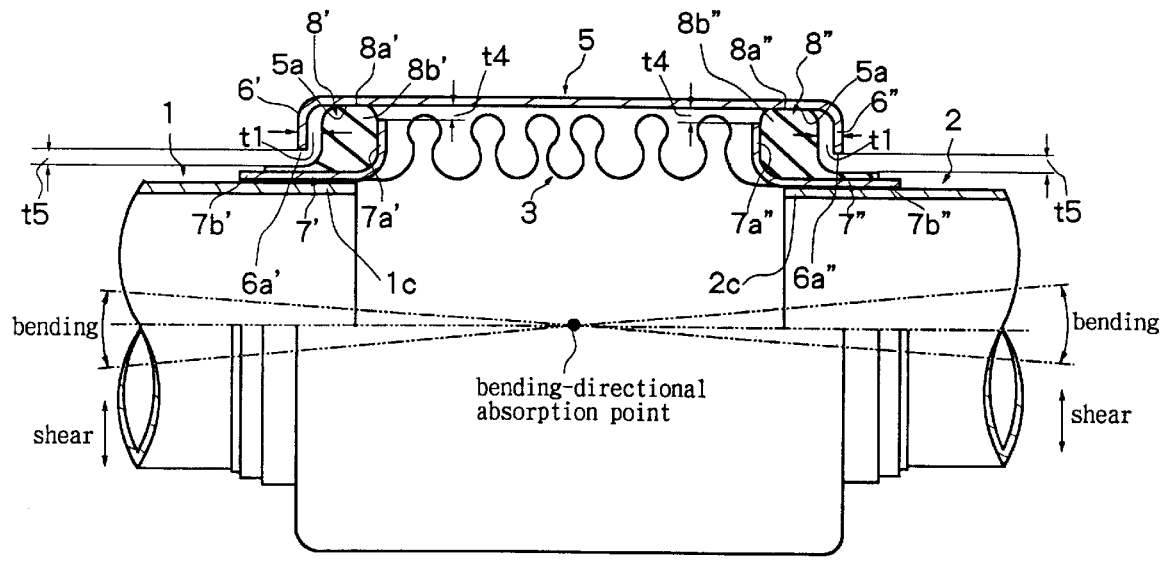
FIG. 1 is a half sectional view showing the embodiment 1 of the flexible tube for automobile exhaust system according to the present invention.
Figure 2:
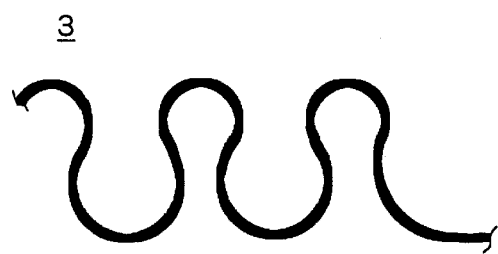
FIG. 2 is a sectional view showing a portion of the bellows to be used in the embodiment 1.

The configuration of the embodiment 1 will be described as follows:

FIG. 1 is an overall sectional view showing the embodiment 1 of the flexible tube for automobile exhaust system according to the present invention corresponding to the claim 1 of the invention;

FIG. 2 is a sectional view showing a portion of the bellows to be used in the embodiment 1.

In FIG. 1, Numeral 1 is a first exhaust pipe; 2 is a second exhaust pipe; 3 is a bellow assembly or bellows; 5 is an outer cover; 6' is a first elongation displacement stopper member; 6" is a second elongation displacement stopper member; 7' is a first collar; 7" is a second collar; 8' is a first elastic stopper member and 8" is a second elastic stopper member.

The both ends of the bellows 3 are respectively connected to the first and second exhaust pipes 1, 2, so as to absorb the displacements of the first and second exhaust pipes 1, 2.

As shown in FIG. 2, this bellow assembly is made of two-layered thin-wall plate 0.2 mm thick (conventionally 0.3 mm thick), thus substantially reducing the number of bellows as compared to the conventional bellow assembly.

The reduced number of bellows in the bellow assembly 3 could eliminate the need for the conventional inner blade installed inside the bellows 3 to prevent air flow from sounding.

The outer cover 5 made of plate is shaped into a cylinder to cover the outer periphery of the bellows 3.

At the both longitudinal ends of the outer cover 5, a first elongation displacement stopper member 6' and a second elongation displacement stopper member 6" are respectively formed by bending the both ends of the outer cover 5 inward, and their inner faces function to restrict the elongation-directional maximum displacement of the bellows 3.

The first collar 7' and the second collar 7" are respectively connected (spot welded) to the both exhaust pipes 1, 2 along with the bellow assembly 3, and their inner ends are respectively bent up toward the inside surface of the outer cover 5 so as to form risers 7a' and 7a".

The first elastic stopper member 8' and the second elastic stopper member 8" are respectively provided at the risers 7a', 7a" of the both collars 7', 7" so as to leave a tube-axis-directional gap t1 equivalent to the allowable maximum displacement of the bellow assembly 3 to the respective stopper surfaces of the elongation displacement stopper members 6', 6".

For the both elastic stopper members 8', 8", mesh member is used which is made by compression forming a net-like member of fine stainless steel wire into a ring. The outer peripheral surfaces 8a', 8a" contact support the inner faces 5a at the both ends of the outer cover 5 so that the central portion of the bellow assembly 3 be as the bending-directional absorption point.

Now, the operation of the flexible tube according to the embodiment 1 will be described as follows:

Displacement Absorption Operation

When vibration which causes pipe-axis directional, bending-directional or shear-directional displacement to the first exhaust pipe 1 and the second exhaust pipe 2 from the engine or car body is inputted, the displacement input can be absorbed by a uniform deformation characteristics which deforms the bellow assembly 3 as a whole.

In other words, before this application, this applicant proposed a technology in which one end portion of the outer cover is fixed to the first exhaust pipe (patent application No. 124922/1995). However, according to the technology, because a displacement input acts mostly on the side of the elastic stopper member, the displacement input is absorbed by the bellows' deformation at the side of the elastic stopper member. That means that the preceding application will not uniformly make most of the deformation characteristics of the overall bellows. On the contrary, the embodiment 1 of this invention can uniformly absorb the displacement by the overall deformation of the bellows 3, because the displacement input can uniformly act on the bellows as a whole.

Further, since the inner surfaces of the both end portions of the outer cover 5 are supported by the first and second elastic stopper members 8', 8" with the central portion of the bellows 3 as the bending-directional absorption point, in case where this invention is compared with the preceding application in which the side of the first exhaust pipe of the bellows is selected as the bending-directional absorption point, bending freedom or the freedom for a pipe-axis-orthogonal-directional input is increased, thus resulting in an enhancement in bending-directional and shear-directional displacement absorption capability.

In such a displacement absorption operation, since the bellow assembly 3 is a single part whose both end portions are connected to the first and second exhaust pipes 1, 2, and the outer cover 5 is elastically supported for the both elastic stopper members 8', 8" at a slight contact area, the spring constant of the flexible tube mostly depends only on the spring constant of the bellow assembly 3 as far as the displacement region which is not subject to restriction is concerned. Therefore, when this embodiment 1 is compared with the conventional flexible tube with the same bellow assembly and the wire-mesh filling construction, the spring constant of the flexible tube can be suppressed lower, thereby allowing for use of thinner bellows 3 and less number of bellows 3, thus resulting in smaller-size and lighter-weight.

Elongation Displacement Restriction Operation

Let us assume that a large elongation displacement is inputted in the tube-axis direction. Since the first and second elongation displacement stopper members 6', 6" formed by inwardly bending the both end portions of the outer cover 5 are provided, when the first and second elastic stopper members 8', 8" move in the tube-axis direction as the elongation develops, (1) as far as the movement is within the preset gap t1, the both elastic stopper members 8', 8" move smooth while making contact with the inner surfaces 5a of the outer cover 5, and (2) when the both elastic stopper members 8', 8" run against the both elongation displacement stopper members 6', 6", the both elastic stopper members 8', 8" will slightly move by their elastic deformation length, and at last both members 8', 8" will come to a stop.

Therefore, the elongation-directional maximum displacement of the bellow assembly 3 connected to the both elastic stopper members 8', 8" can be restricted, thus preventing the bellow assembly 3 from being over-extended.

Under this displacement restriction being applied, the elongation-directional maximum displacement of the bellow assembly 3 is controlled by the gap t1 provided in between the both elastic stopper members 8', 8" and the both elongation displacement stopper members 6', 6", only a presetting of proper gap t1 can control a stable elongation displacement restriction.

Protective Operation for Bellows

When pebbles are kicked up by tire during car running, since the flexible tube is exposed to the atmosphere on the bottom of a vehicle, pebbles and the like may run against the flexible tube.

Since the collision input applied from the outside acts on the outer cover 5 made of plate covering the outer periphery of the bellows 3, a collision of the kicked up pebbles may result only in a deformation of the outer cover 5, but the bellows 3 themselves can be protected from deformation or damage.

Now, description will be made for the effect of the flexible tube according to the invention as follows:

(1) With the flexible tube for an automobile exhaust system according to the embodiment 1, which has the bellow assembly 3 to absorb the displacements of the first and second exhaust pipes 1, 2 to be installed in the automobile exhaust system:

The outer cylindrical casing for protecting the bellow assembly 3 from damaging and preventing the bellow assembly 3 from being over-extended comprises:

the cylindrical outer cover 5 made of plate, so as to cover the outer periphery of the bellows 3;

the first and second collars 7', 7" formed with the risers 7a', 7a" bent toward the inner surface 5a of the outer cover 5;

the first and second elongation displacement stopper members 6', 6" formed by bending the both end portions of the outer cover 5 inward; and the first and second elastic stopper members 8', 8" provided at the risers 7a', 7a" of the both collars 7', 7".

Therefore, with a low-cost, small-sized and light-weight construction without using the conventional wire-mesh construction, the flexible tube according to the invention can well achieve a stable control of elongation displacement restriction, a long service life of the bellow assembly 3 and an enhancement in bending-directional and shear-directional displacement absorption capability.

(2) The bellow assembly 3 can reduce the number of bellows by using thin-walled two-layered products and eliminate the conventional inner blade to be provided inside the bellows 3, thereby achieving a highly enhanced small size and light weight as well as a high cost reduction.

In other words, reason for this outstanding feature is as follows:

Since the spring constant of the flexible tube according to the invention depends only on the design of the bellow assembly or bellows 3, not only the use of thin-walled multi-layered products as material in designing the bellows 3 can obtain a low spring constant due to the shorter bellow assembly 3 with less number of bellows, but also the less number of bellows 3 makes the exhaust gas flow sound significantly lower, so that the conventional inner blade installed inside the bellow assembly 3 mainly for prevention of gas flow sound can be positively eliminated.

(3) The elastic stopper members 8', 8" are made of mesh member which is manufactured by compression forming a fine stainless steel wire net into ring shape, and the outer peripheral surfaces 8a of the elastic stopper members 8', 8" are so arranged as to have a contact with the inner surface 5a of the outer cover 5, so that an effective displacement absorption capability and an intrusion proof of soil, sand and salt can be obtained.

Embodiment 2

Figure 3:
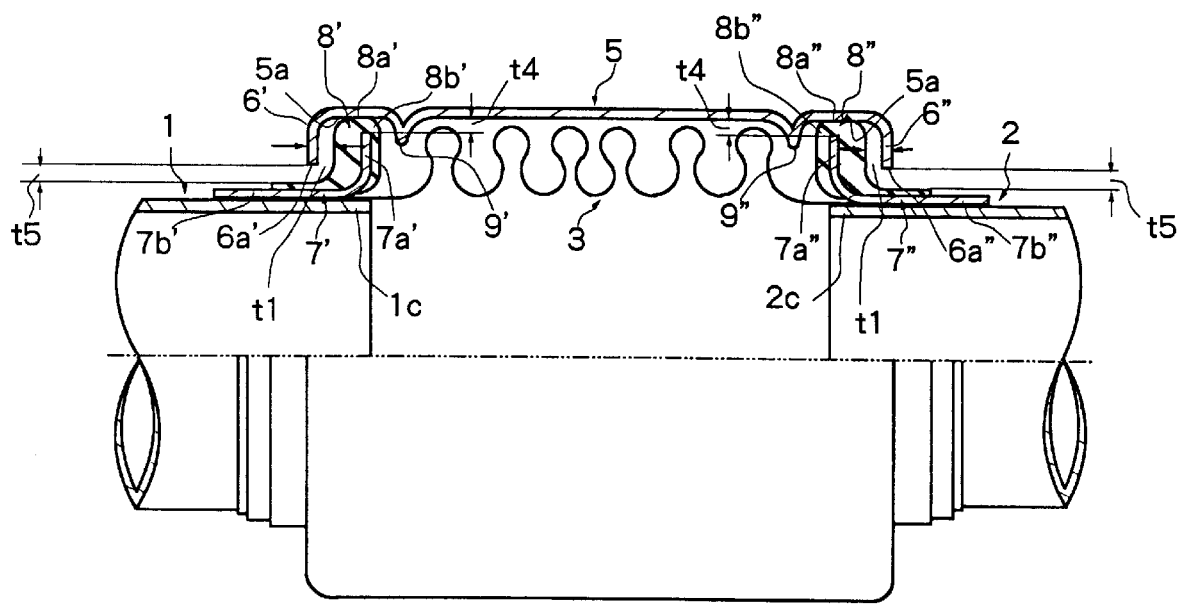
FIG. 3 is a half sectional view showing the embodiment 2 of the flexible tube for automobile exhaust system according to the invention.
Figure 4:
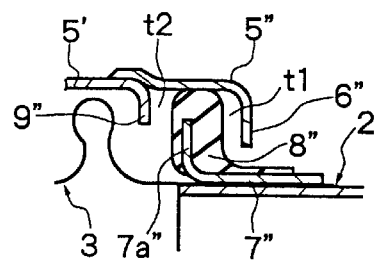
FIG. 4 is a sectional view showing the essential portion of a modified example of the embodiment 2.

First, the configuration of the embodiment 2 is described as follows:

FIG. 3 is an overall sectional view showing the embodiment 2 of the flexible tube for automobile exhaust system according to the invention, corresponding to claims 1 and 2; and FIG. 4 is a sectional view showing the essential portion of a modified example of the embodiment 2.

In this embodiment 2, two of first and second contraction displacement stopper members 9', 9" are provided to the outer cover 5 additionally to the both elongation displacement stopper members 6', 6".

In other words, in FIG. 3, the outer cover 5 is embossed with a plurality of the first and second contraction displacement stopper members 9', 9" with equal spacing at a same outer peripheral position inside of the both elongation displacement stopper members 6', 6". A surface of the first or second contraction displacement stopper member 9', 9" facing the corresponding elastic stopper member 8' or 8" with a tube-axis-directional gap t1 (equivalent to the allowable maximum displacement) functions as the stopper surface to restrict the contraction-directional maximum displacement of the bellow assembly 3.

In this connection, according to the embodiment 2, the aforementioned both elastic stopper members 8', 8" are so arranged as to cover the risers 7a', 7a" of the both collars 7', 7".

This arrangement is provided to prevent the risers 7a', 7a" from directly striking the both contraction displacement stopper members 9', 9".

On the contrary, the outer cover 5 shown in FIG. 4 consists of a first outer cover 5' and two second outer covers 5", 5" welded thereto at the both ends of the outer cover 5'. The both contraction displacement stopper members 9', 9" are formed by bending the end portions of the first outer cover 5'. The end portion of the second outer cover 5" is bent to form the elongation displacement stopper member 6' or 6". In this connection, the positional relationship of the displacement stopper members 6', 6" and 9', 9" for the elastic stopper members 8', 8" is similar to FIG. 3. Other configurations are the same as the embodiment 1, so eliminating detailed description while attaching the same signs to the same components.

Next, the operation will be described as follows:

Restriction Operation for Contraction Displacement

When a displacement input that causes the first and second exhaust pipes 1, 2 a larger pipe-axis-directional contraction displacement takes place, the both contraction stopper members 9', 9" and the both elastic stopper members 8', 8" combine together to constitute the stopper mechanism for the input, so that the contraction-directional maximum displacement of the bellow assembly 3 is restricted by contact with the contraction displacement stopper members 9', 9" and the elastic stopper members 8', 8", thereby preventing the bellow assembly 3 from being deformed by contraction.

In this connection, other operations are similar to those of the embodiment 1, thus omitting detailed description.

Now, the effect of the embodiment 2 will be described as follows:

In addition to the effects (1)~(3) of the embodiment 1, the embodiment 2 has following effect (4):

(4) Since the both contraction displacement stopper members 9', 9" are provided to the outer cover 5, and their surfaces facing the both elastic stopper members 8', 8" with a gap t2 equivalent to the pipe-axis-directional allowable maximum displacement function as stopper surfaces for restricting the contraction -directional maximum displacement of the bellow assembly 3, the embodiment 2 can restrict not only the elongation-directional maximum displacement of the bellows 3, but also the contraction-directional maximum displacement of the bellows 3.

Embodiment 3

Figure 5:
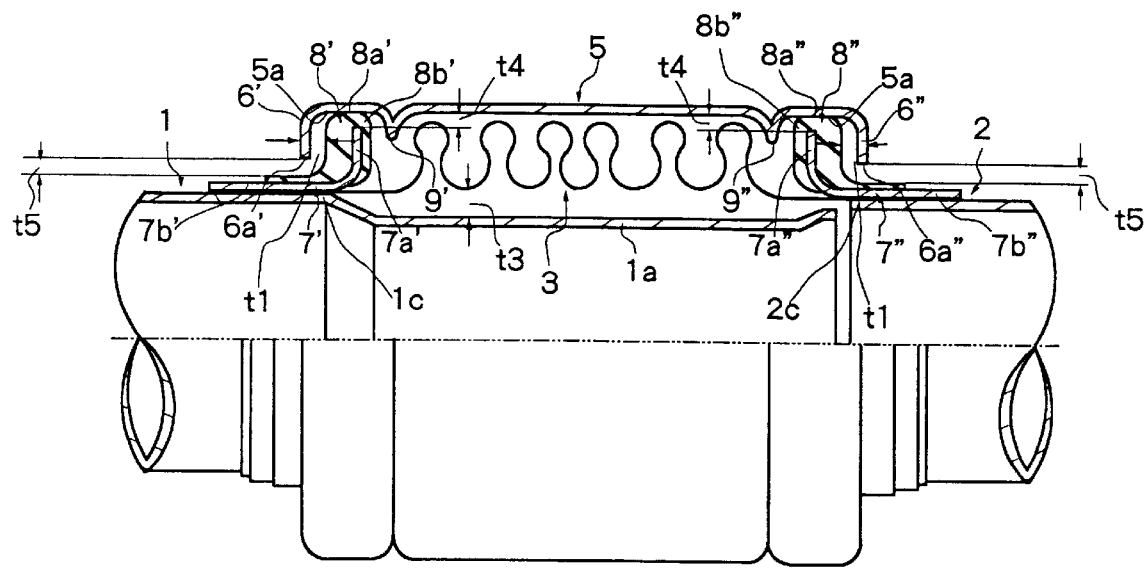
FIG. 5 is a half sectional view showing the embodiment 3 of the flexible tube for automobile exhaust system according to the invention.
Figure 6:
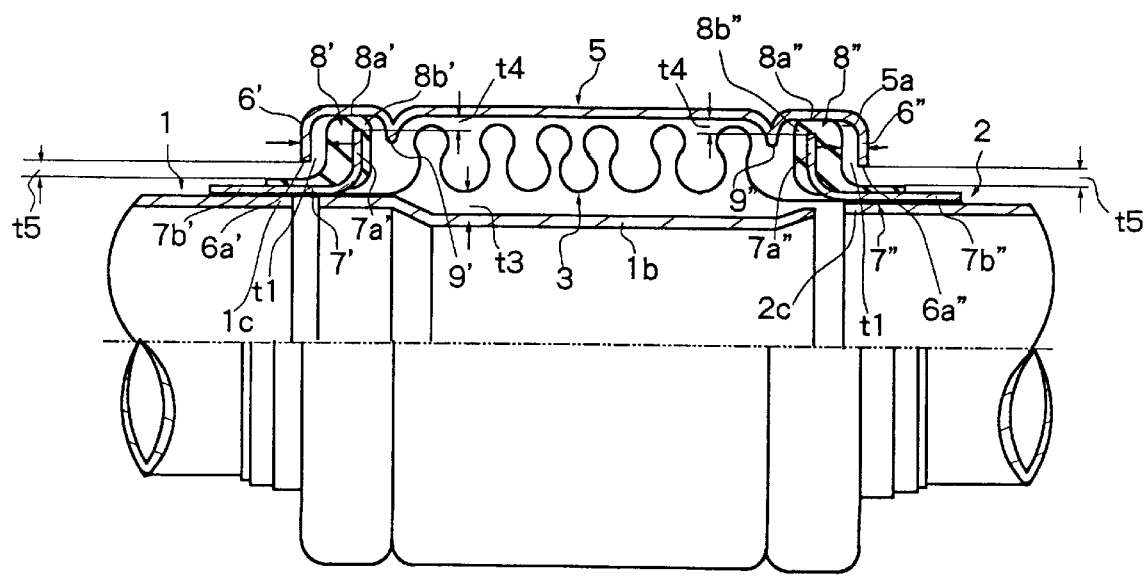
FIG. 6 is a half sectional view showing a modified example of the embodiment 3 of the flexible tube for automobile exhaust system according to the invention.
Figure 7:
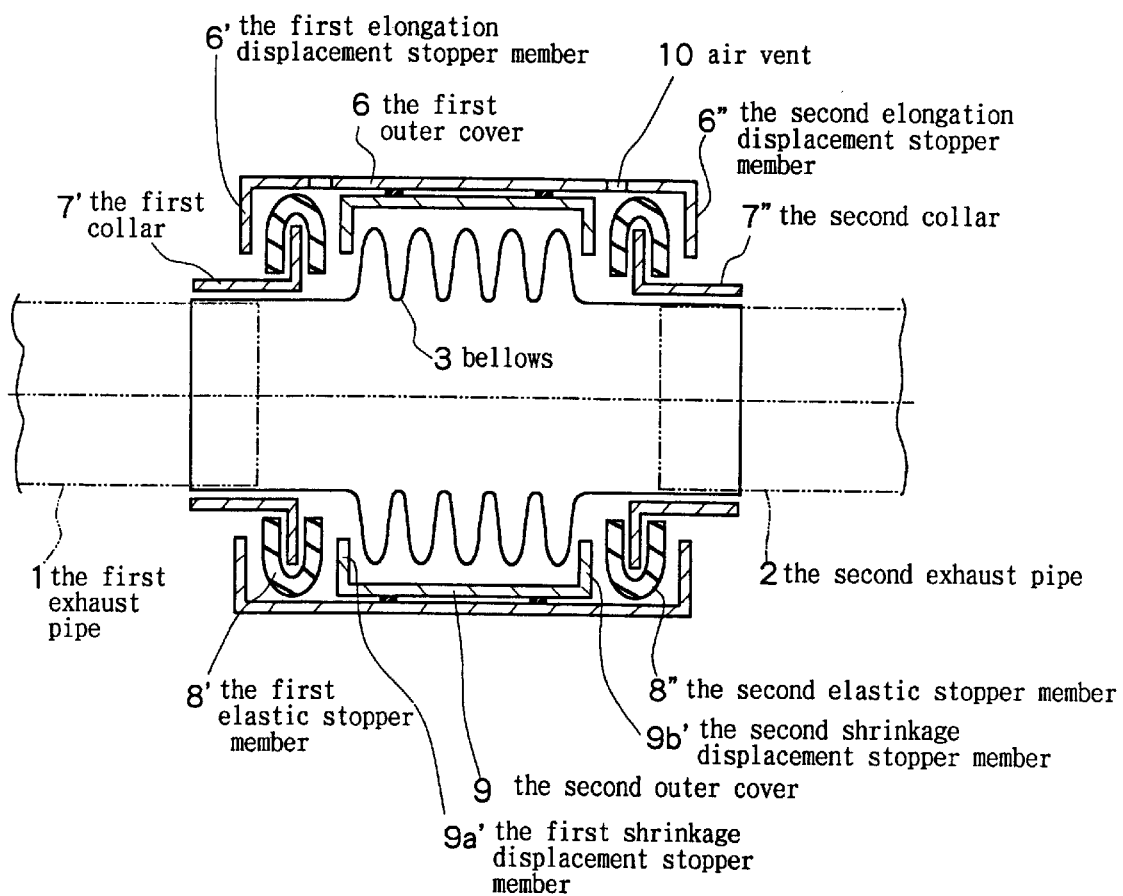
FIG. 7 is a reference-to-claim drawing showing the embodiment 4 of the flexible tube according to the invention.

First, the configuration of the embodiment 3 will be described as follows:

FIG. 5 is an overall sectional view showing the embodiment 3 of the flexible tube for automobile exhaust system according to the invention, corresponding to claims 1~3. FIG. 6 is a sectional view showing a modified example of the embodiment 3.

This embodiment 3 additionally gives the first exhaust pipe 1 the feature which could be brought about by the conventional inner blade.

As described in detail previously, this invention requires the smaller number of bellows, so that the less bellows can reduce not only the production of sound due to the inner blade as much as possible, but also the thermal degradation of bellows due to exhaust gas, but if further protection is required for the bellows, the bellows can have a casing thereinside.

More particularly, in FIG. 5, an extension casing 1*a* can be added to the exhaust pipe 1 so as to essentially cover the inner periphery of the bellows 3, with a radial clearance t3 between them.

In FIG. 6, an exhaust pipe partition casing 1*b* is fixed to the end portion of the bellows 3 so as to essentially cover the inner periphery of the bellows 3 with an arbitrary radial clearance t3 between them.

Other configurations are the same as the embodiment 2, so eliminating detailed description while attaching the same signs to the same components.

Now, description will be made for the effect of the embodiment 3:

The exhaust pipe extension or partition member 1*a*, 1*b* is provided to the first exhaust pipe 1 so as to essentially cover the inner periphery of the bellows 3, so that, if such inner blade functions as thermal insulation, thermal shielding and reduction of gas flow sound are required, the exhaust pipe extension or partition member 1*a*, 1*b* can well display similar effects, thus eliminating the need for such costly inner blade.

Further, there is an arbitrary radial clearance t3 set between them, so that, even if engine roll vibration or others should bend the bellows 3, there will be no interference between the exhaust pipe extension or partition member 1*a*, 1*b* and the bottom of the bellows 3.

Now, description will be made for the effects of the embodiment 3 as follows:

In addition to the effects (1)~(4) of the embodiments 1, 2, the embodiment 3 has a following effect (5):
(5) The exhaust pipe extension or partition member 1*a*, 1*b* is provided to the first exhaust pipe 1 so as to essentially cover the inner periphery of the bellows 3, and there is an arbitrary radial clearance t3 set between the exhaust pipe extension or partition member 1*a*, 1*b* and the bellows 3, so that not only the first exhaust pipe 1 is cost effectively utilized while having the feature of the inner blade, but also an otherwise possible interference between the exhaust pipe extension or partition member 1*a*, 1*b* and the bellows 3 can be prevented.

Modifications to Embodiments 1~3

With the embodiments 1~3, as the elastic stopper member, shown is the aforementioned example in which a mesh member manufactured by compression forming a fine stainless steel wire net into ring is used, but other members may be used if good thermal proofness, stable stop function and proper elasticity are satisfied.

Further, according to the embodiments 1~3, the portion of the outer cover 5 for covering the bellows 3 is a casing made of single solid material. The portion is not limited to such a configuration, but may be a configuration consisting of two partitioned parts which totally cover the bellows 3.

Such partitioned configuration can realize following easier installation process: First, assemble other parts than the outer cover 5. Then, insert the outer cover 5 from both sides. Finally, weld the contact portions of them, to complete a flexible tube integrated with the outer cover 5.

Such a configuration can easily produce a flexible tube integrally incorporating the outer cover 5.

Embodiment 4

Figure 8:
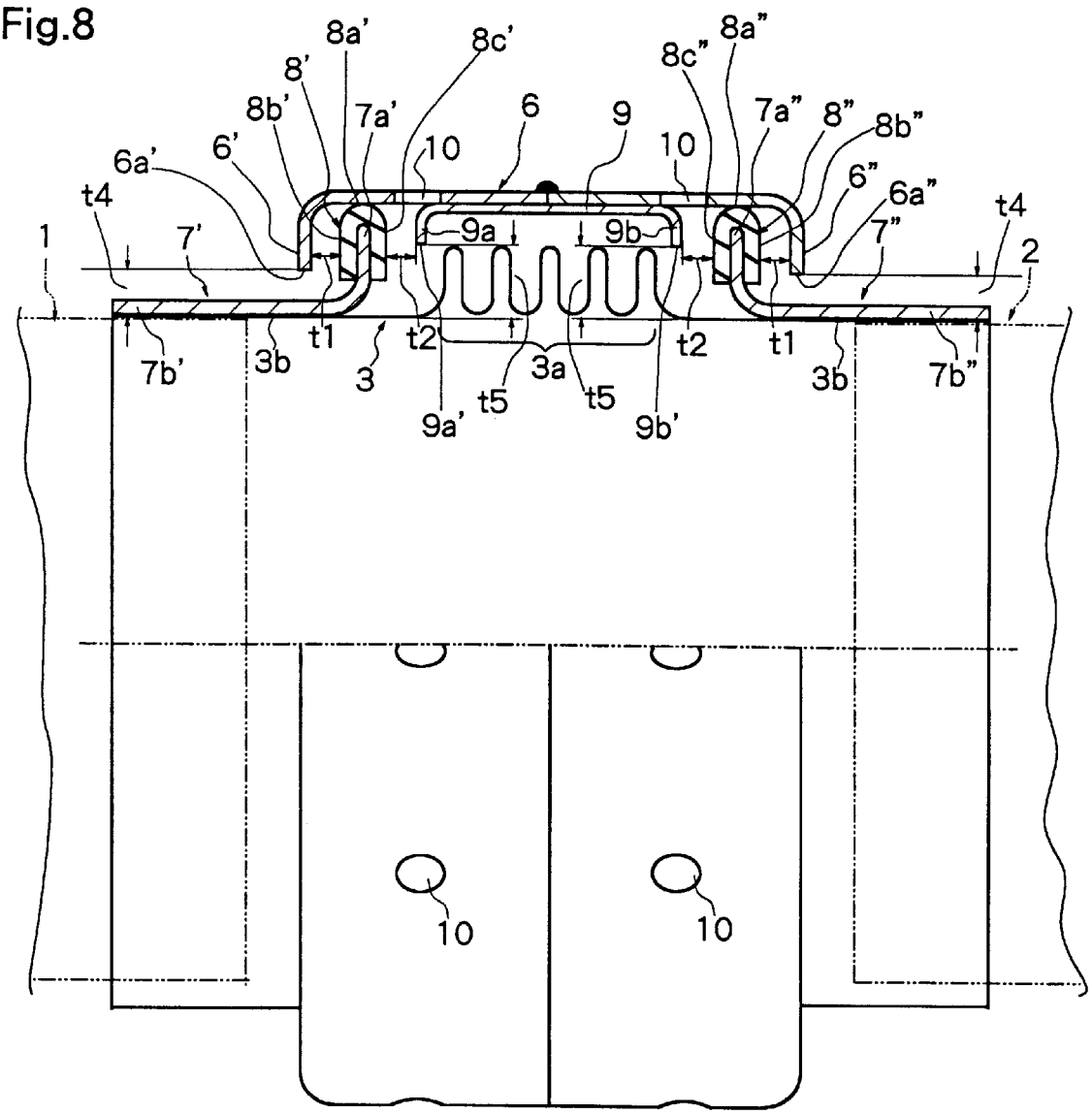
FIG. 8 is a half sectional view showing the embodiment 4.

First, described is the configuration of the embodiment 4 as follows:

FIG. 8 is an overall sectional view showing the flexible tube for an automobile exhaust system according to the embodiment 4 corresponding to claims 4 and 5 of this invention.

In FIG. 8, Numeral 5 is a first outer cover; 9 is a second outer cover; and 10 is air vents.

The both end portions of the bellow assembly 3 are respectively connected to the first and second exhaust pipes 1, 2 to absorb the elongation, contraction and other displacements of the both exhaust pipes 1, 2 by means of the deformation of the bellow components 3*a*. For the material of the bellows 3, used are thin-walled multi-layered products made of thin plate 0.2 mm thick (conventionally 0.3 mm thick). The thin plates are two-layer overlapped so as to have less number of bellow components for lower spring constant.

The aforementioned first collar 7' and second collar 7" are respectively connected to the outer peripheries of the both ends cylindrical potions 3*b*, 3*b* of the bellow assembly 3. Radial risers 7*a*', 7*a*" are formed by bending outward at the side of the bellows 3 of the both collars 7', 7".

The aforementioned first elastic stopper member 8' and second elastic stopper member 8" are respectively provided at the risers 7*a*', 7*a*" so as to cover them. The both elastic stopper members 8', 8" are made of elastic and high-temperature resistant raw materials, such as ones manufactured by compression forming a fine stainless wire net into ring shape or the ones further carbon impregnated.

The first outer cover 5 is formed into casing so as to cover the outer periphery of the bellows 3. Both end portions of the first outer cover 5 are supported by the surface contact of the tip ends of the first and second elastic stopper members 8' and 8".

First and second elongation displacement stopper members 6', 6" are formed at the both longitudinal ends of the first outer cover 5 by bending inwardly the both end portions thereof, so as to have tube-axis-directional gaps t1, t1 respectively between the first and second elastic stopper members 8' and 8". The inner bent surfaces of the elongation displacement stopper members 6', 6" function as stopper surface for restricting the elongation-directional maximum displacement of the bellows 3.

The second outer cover 9 is formed into casing so as to cover the outer periphery of the accordionlike portion 3*a* of the bellows 3, and integrally fixed to the central inner surface of the first outer cover 5.

First and second contraction displacement stopper members 9*a*, 9*b* are formed at the both ends of the second outer cover 9 by bending the both ends inwardly, so as to have tube-axis-directional gaps t2, t2 between the first and second elastic stopper members 8', 8". The outer surfaces of the contraction displacement stopper members 9*a*, 9*b* function as stopper surfaces to restrict the contraction-directional maximum displacement of the bellows 3.

In this connection, when a first outer cover 5 with the elongation displacement stopper members 6', 6" is made from one sheet of plate material, the first outer cover 5 cannot be assembled.

Therefore, at first, the first outer cover 5 consists of two left and right split covers. One (left or right) partitioned cover member is previously welded to the second outer cover 9. When assembling, the other partitioned cover is integrally welded to the subassembly into a double outer cover construction for completion of the flexible tube.

The air vents 10 are opened in the first outer cover 5 at positions which communicate the first elastic stopper member 8' to the first contraction displacement stopper member 9a as well as the second elastic stopper member 8" to the second contraction displacement stopper member 9b.

Now, description will be made for the operation as follows:

Displacement Absorption Operation

When such vibration as giving the first and second exhaust pipes 1, 2 a pipe-axis-directional, bending-directional or shear-directional displacement from the engine or car body is inputted, the displacement input is absorbed by a deformation of the bellows 3.

When this displacement is being absorbed, only the bellow assembly 3 is connected to the first and second exhaust pipes 1, 2 at its both ends. Since the both outer covers 5, 9 are elastically supported by the both elastic stopper members 8', 8" at a slight contact area, the spring constant of the flexible tube depends essentially on only the spring constant of the bellows 3 within the range where the displacement is not subject to restriction.

Figure 9:
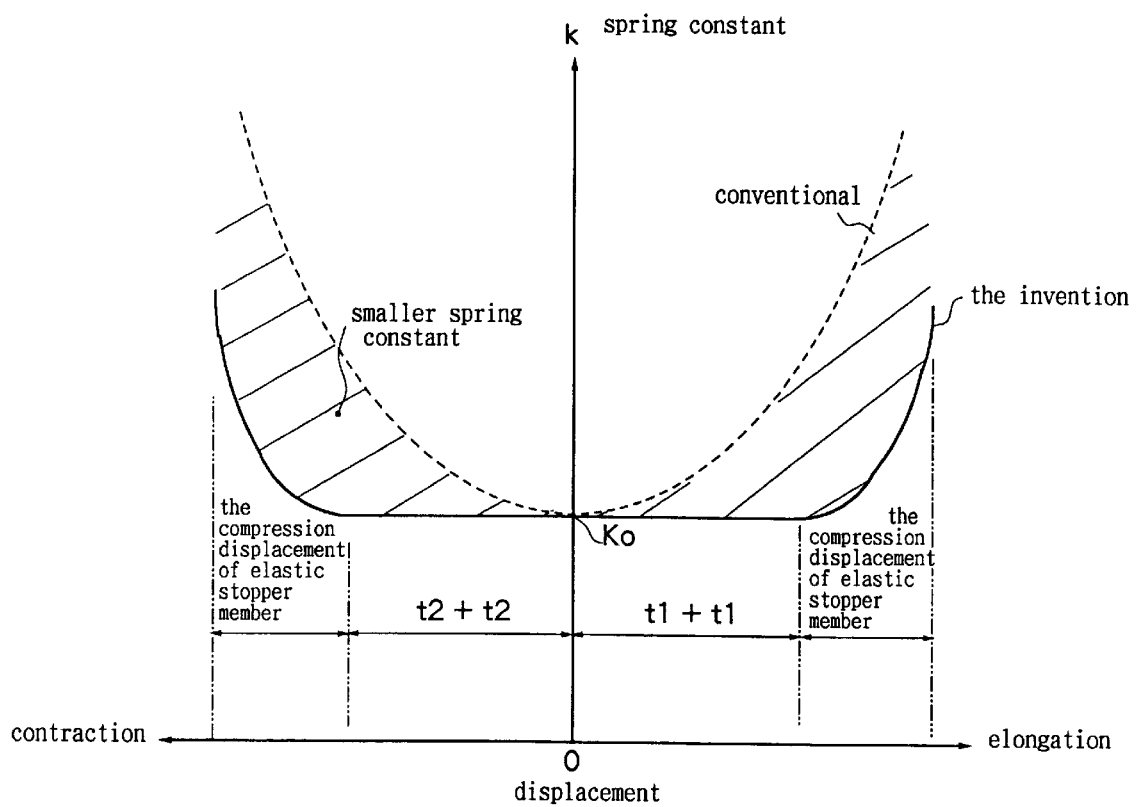
FIG. 9 is an illustration for comparison showing the spring constant characteristics of the embodiment 4 of the flexible tube for automobile exhaust system according to the invention and a conventional flexible tube for automobile exhaust system.
Figure 10:
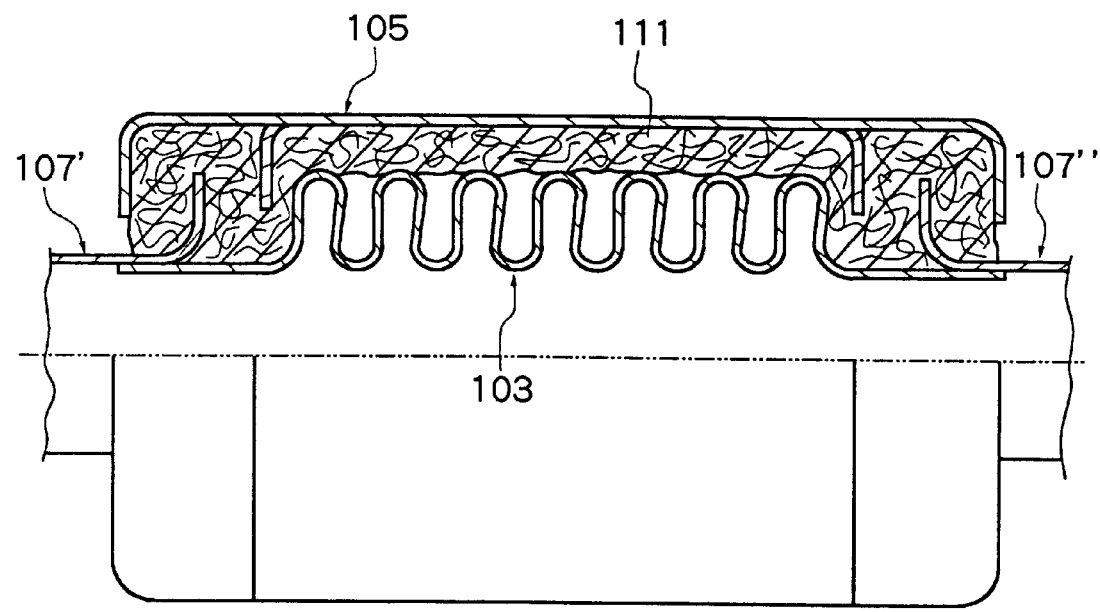
FIG. 10 is a sectional view showing a conventional flexible tube for automobile exhaust system.

More specifically, as shown in FIG. 9, (a) in a displacement region without restriction or smaller than gap (t1+t1) for elongation or smaller than gap (t2+t2) for contraction, the spring constant k of the flexible tube is maintained essentially at the spring constant k0 of the bellows 3, but (b) in a displacement region with restriction or larger than gap (t1+t1) for elongation or larger than gap (t2+t2) for contraction, contribution of the compression displacement of the both elastic stopper members 8', 8" causes an increase in the spring constant of the flexible tube.

On the contrary, with the conventional flexible tube filled with wire mesh around the outer periphery of the bellows, since not only the bellows but also the wire mesh must deform so as to respond to the displacement input, as shown in FIG. 9 by the dotted line, even a slight elongation or contraction displacement directly increases the spring constant of the conventional flexible tube. As a result, the spring constant of the flexible tube according to the invention can have a smaller spring constant than the conventional one by the hatched magnitude.

Therefore, according to the invention, in designing spring constant k of a flexible tube, that is, the guideline for the displacement absorption capacity of the flexible tube so as to match a level which can develop a displacement absorption requirement, there is no necessity for considering spring constant increasing elements (other than the spring constant K0 of the bellow assembly 3), thereby reducing the number of bellows 3, thus resulting in a small-sized, light weight flexible tube.

Displacement Restriction Operation

When a larger elongation displacement is inputted, that is, the both elastic stopper members 8', 8" move in the tube-axis direction as the both exhaust pipes 1, 2 are elongating, (a) as long as the displacement is within the set gap t1, the provision of the both elongation displacement stopper members 6', 6" formed by bending inwardly the both end portions of the first outer cover 5 can create a smooth movement of the bellow assembly 3 while making a smooth sliding contact to the inner surface of the first outer cover 5, and then, (b) when the both elastic stopper members 8', 8" run against the both elongation stopper members 6', 6", the members 8, 8" can slightly move by their own elasticity, thereafter ending in a stop, so that the elongation-directional maximum displacement of the bellows 3 connected with the both elastic stopper members 8', 8" is restricted, thus preventing an over-extension of the bellows 3.

When a larger contraction displacement is inputted, that is, the both elastic stopper members 8', 8" move in the tube-axis direction as the both exhaust pipes 1, 2 are contracting, (a) as long as the displacement is within the set gap t2, the provision of the both contraction displacement stopper members 9a, 9b formed by bending inwardly the both end portions of the second outer cover 9 can create a smooth movement of the bellow assembly 3 while making a smooth sliding contact to the inner surface of the first outer cover 5, and then, (b) when the both elastic stopper members 8', 8" run against the both contraction stopper members 9a, 9b, the members 8, 8" can slightly move by their own elasticity, thereafter ending in a stop, so that the contraction-directional maximum displacement of the bellows 3 connected with the both elastic stopper members 8', 8" is restricted, thus preventing an over-contraction of the bellows 3.

While these elongation or contraction displacement is restricted, the elongation-directional or contraction-directional maximum displacement of the bellows 3 is restricted by the gap t1 or t2 in between the both elastic stopper members 8', 8" and the stopper surfaces. Therefore, only an initial proper setting of the gaps t1, t2 so as not to have an excessive deformation of bellows 3 which will cause the bellows 3 to reach a plastic deformation region can stably control the displacement restriction requirement without changing the spring constant of the bellows 3.

Protective Operation for Bellows

When a running car is kicking up pebbles by tire or others, the double covering of the outer periphery of the bellows 3 by the both outer covers 5, 9 can safely protect the bellows 3 from damage, even when kicked pebbles should apply a large external force.

Heat-Affection-on-Bellows Reduction Operation

When high temperature exhaust gas flows inside of the bellows 3 for an extended period of time, high temperature air may stay around the bellows 3 covered with the both outer covers 5, 9, as the bellows c become hot.

For this reason, air vents 10 are opened in the first outer cover 5 so as for ambient air to communicate to the outer peripheral space of the bellows 3. Therefore, the trapped inner hot air can be released to the atmosphere through the air vents 10, thereby maintaining the temperature in the outer peripheral space of the bellows 3, thus preventing the bellows 3 from materially degrading and from being subject to thermal affection such as high-temperature salt contamination corrosion. In this connection, as with the high-temperature salt contamination corrosion, the air vents 10 can not only prevent the bellows from becoming too hot, but also work so as to reject salt water, when salty water should enter the outer periphery of the bellows 3.

Therefore, this configuration has three following features: (1) prevention of over-tension or over-contraction due to its displacement restriction operation; (2) protection form damage due to the both outer covers 5, 9; and (3) warranty of the long service life of the bellows c due to preventive feature of the air vents 10 against too much heating.

Now, expected effects are described as follows:

(1) This embodiment 4 comprises:

the bellows 3 whose both end portions are connected respectively to the first exhaust pipe 1 and the second exhaust pipe 2;

the first collar 7' and the second collar 7" respectively connected to the both end cylindrical portions of the bellows 3;

the first elastic stopper member 8' and the second elastic stopper member 8" provided at the risers 7a', 7a" of the both collars 7', 7";

the first outer cover 5 and the second outer cover 9 of double cylindrical shape whose both ends are supported by the first elastic stopper member 8' and the second elastic stopper member 8";

the first elongation displacement stopper member 6' and the second elongation displacement stopper member 6" formed by bending the both ends of the first outer cover 5 inwardly; and the first contraction displacement stopper member 9a and the second contraction displacement stopper member 9b formed by bending the both ends of the second outer cover 9 inwardly.

Therefore, the embodiment 4 can not only stably control the displacement restriction requirement, but also achieve a substantial enhancement in service life of the bellows 3, with a low-cost, small-sized and light-weight construction and without using the wire-mesh filling construction.

(2) A plurality of air vents 10 are opened in the first outer cover 5 at positions where the atmosphere communicates to the outer peripheral space of the bellows 3, so that this configuration can maintain the temperature in the outer peripheral space of the bellows 3 low enough, thus resulting in strict suppression of heat affection to the bellows 3.

Modification to Embodiment 4

As the elastic stopper member material, the embodiment 4 used mesh members which are manufactured by compression forming fine stainless steel net into ring shape, but other types of members can be used providing that the material can satisfy high heat resistance and elasticity together.

Availability in the Industry

As described in detail, claim 1 according to the present invention can achieve a stable control of elongation displacement restriction; an enhancement in the service life of the bellow assembly; and maintenance of bending-directional and shear-directional displacement absorption capability, while having a low-cost, small-sized and light-weight configuration without using the conventional wire mesh filling construction.

In addition to the above-described effects of claim 1, claim 2 can have a contraction-directional maximum displacement restriction function of the bellow assembly.

In addition to the above-described effects of claims 1 and 2, claim 3 can have the first exhaust pipe which is provided with an inner blade function and a function to eliminate interference with the bottom portion of the bellow components, thus more positively ensuring the above-described effects.

Claim 4 can achieve a stable control of displacement restriction and an enhancement in the service life of the bellow assembly, while having a low-cost, small-sized and light-weight configuration without using the conventional wire mesh filling construction.

Claim 5 can achieve the effects of claim 4 while suppressing thermal affection to the bellows.

What is claimed is:

1. A flexible tube for an automobile exhaust system, which is provided with a bellow assembly (3) whose both longitudinal ends are connected respectively to a first exhaust pipe (1) and a second exhaust pipe (2) to absorb vibrational displacement of both exhaust pipes (1), (2), and with a surrounding member which is so installed as to cover the outer periphery of said bellows (3) to protect said bellows (3) and prevent said bellows (3) from over-extending, being characterized in that:

said bellow assembly (3) has central accordion like components or bellows and cylinders formed at their both ends; and said surrounding member consists of:

a. a first collar (7') and a second collar (7") which are respectively connected to the outer periphery of both ends of cylindrical portions (3b) of said bellow assembly (3), said first collar and second collar comprising:

installed portions (7b'), (7b") which are connected to the outer periphery of both ends (1c), (2c) of said first exhaust pipe (1) and said second exhaust pipe (2); and risers (7a'), (7a") bent toward the inner side of said outer cover (5) from bellow component (3a) of the installed portions (7b') and (7b");

b. a first elastic stopper member (8') and a second elastic stopper member (8") which are provided along the installed portions (7b'), (7b") comprising:

elongated portions (8b'), (8b") which elongate from the risers (7a'), (7a") to the side of the outer cover (5);

an outer peripheral surface (8a'), (8a") of said elongated portions (8b'), (8b") which contacts and supports an inner surface of both ends of the outer cover (5); and a gap (t1) disposed between the inner surface of both ends of the outer cover (5) and the risers (7a'), (7a");

c. a first elongation displacement stopper member (6') and a second elongation displacement stopper member (6") which are integrally formed at both ends of said outer cover (5) and are elongated from said both ends of the outer cover (5) towards the central axis of the first exhaust pipe (1) and the second exhaust pipe (2), and there is a gap (t4) between ends (6a'), (6a") of both elongation displacement stopper members (6'), (6") and said installed portions (7b'), (7b") of both collars (7'), (7"); and whereby gaps (t1), (t4), (t5) are formed between members a, b, and c above, with the gaps (t1), (t4), (t5) allowing said first exhaust pipe (1) and said second exhaust pipe (2) to move freely without restriction by the outer cover (5), the first elongation displacement stopper member (6') or the second elongation displacement stopper member (6"), and such displacement of the exhaust pipes is absorbed, in accordance with uniform deformation characteristics, enough to deform the bellows (3) as a whole, upon such vibration as to give a pipe-axis-directional, bending-directional or shear-directional displacement to said first exhaust pipe (1) and said second exhaust pipe (2) from a engine or a car body.

2. The flexible tube for an automobile exhaust system as claimed in claim 1, further characterized in that:

a first contraction displacement stopper member (9') and a second contraction displacement stopper member (9") are formed at more interior positions of the outer cover (5) than said both elongation displacement members (6'), (6") so that their surfaces respectively face said elastic stopper members (8'), (8") with a pipe-axis-directional gap (t2), wherein both elastic stopper members (8'), (8") are provided to cover said risers (7a'), (7a") of the first collar (7') and the second collar (7");

upon contraction of the bellows (3), a first contraction displacement stopper member (9') and a second contraction displacement stopper member (9") run against the first elastic member (8') and the second elastic member (8") and not against the risers (7a'), (7a") of the first collar (7') and the second collar (7"), thereby preventing the risers (7a'), (7a") from directly striking both contraction displacement stopper members (9'), (9");

the elastic members (8'), (8") are provided to cover the risers (7a'), (7a"), by running against the contraction displacement stopper members (9'), (9"), so that durability is improved without coming off from the risers (7a'), (7a").

3. The flexible tube for an automobile exhaust system as claimed in claim 1 or claim 2, further characterized in that:

an exhaust pipe extension (1a) or an exhaust pipe partition (1b) is provided to said the first exhaust pipe (1) so as to essentially cover the inner periphery of said bellows (3), and an arbitrary radial clearance (t3) is set in between said exhaust pipe extension (1a) or exhaust pipe partition (1b) and said bellows (3).

4. A flexible tube for an automobile exhaust system, which is provided with a bellow assembly (3) whose both longitudinal ends are connected respectively to a first exhaust pipe (1) and a second exhaust pipe (2) to absorb the displacement of the both exhaust pipes (1), (2), and with a surrounding member which is so installed as to cover the outer periphery of said bellows (3) to protect said bellows (3) and prevent said bellows (3) from over-extending, being characterized in that:

said bellow assembly (3) has central accordion like components or bellows (3a) and cylinders formed at their both ends; and said surrounding member consists of:

a. a first collar (7') and a second collar (7"), which are respectively connected to the outer periphery of both ends of cylindrical portions (3b) of the bellows (3) comprising:

installed portions (7b'), (7b") which are connected to the outer periphery of both ends (1c), (2c), of the first exhaust pipe (1) and the second exhaust pipe (2); and risers (7a'), (7a") bent toward the inner side of said outer cover (5) from bellow component (3a) of the installed portions (7b'), (7b"), b. a first elastic stopper member (8') and a second elastic stopper member (8") whose outer peripheral surfaces (8a'), (8a") contact and support an inner surface of both ends of a first outer cover (5) comprising:

a gap (t1) provided between elongated portions (8b'), (8b") and elongation displacement stopper members (6'), (6");

a gap (t2) provided between inner peripheral surfaces (8c'), (8c") and elastic stopper members (9a), (9b);

c. a first elongation displacement stopper member (6'), and a second elongation displacement stopper member (6"), which are integrally formed at both ends of the first outer cover (6), and are elongated from both ends of the first outer cover (6) toward the central axis of the first exhaust pipe (1) and the second exhaust pipe (2), and a gap (t4) provided between ends (6a'), (6a") of both elongation displacement stopper members (6'), (6") and said installed portions (7b'), (7b") of both collars (7'), (7");

d. a first contraction displacement stopper member (9a) and a second contraction displacement stopper member (9b) are integrally formed by bending inwardly both end portions of a second outer cover (9), and a gap (t2) is provided between ends (9a'), (9b') of both contraction displacement stopper members (9a), (9b) and both ends of cylindrical portions (3b) of the bellows (3);

e. air vents (10) of said first outer cover (5) are formed at the point which occupies the space between the contraction displacement stopper members (9a), (9b) and the elastic stopper members (8'), (8");

whereby gaps (t1), (t4), (t5) are formed between members a, b, and c above, with the gaps (t1), (t4), (t5) allowing said first exhaust pipe (1) and said second exhaust pipe (2) to move freely without restriction by the outer cover (5), the first elongation displacement stopper member (6') or the second elongation displacement stopper member (6"), and such displacement of the exhaust pipes is absorbed, in accordance with uniform deformation characteristics, enough to deform the bellows (3) as a whole, upon such vibration as to give a pipe-axis-directional, bending-directional or shear-directional displacement to said first exhaust pipe (1) and said second exhaust pipe (2) from a engine or a car body.

5. The flexible tube for an automobile exhaust system as claimed in claim 4, further characterized in that:

a plurality of air vents (10) are opened in said first outer cover (6) so as to exclude hot air retained in the outer peripheral space around said bellows (3).

* * * * *